Dec. 26, 1933.   J. A. DAVIS   1,940,788
INTERNAL COMBUSTION ENGINE
Filed Feb. 7, 1931   5 Sheets-Sheet 4
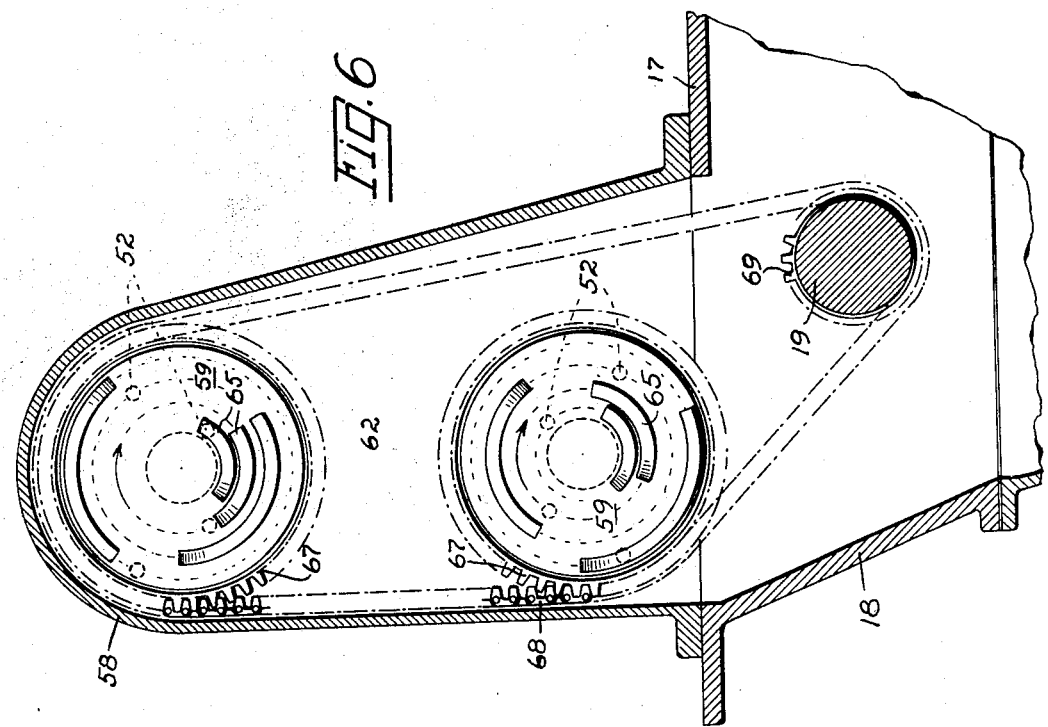
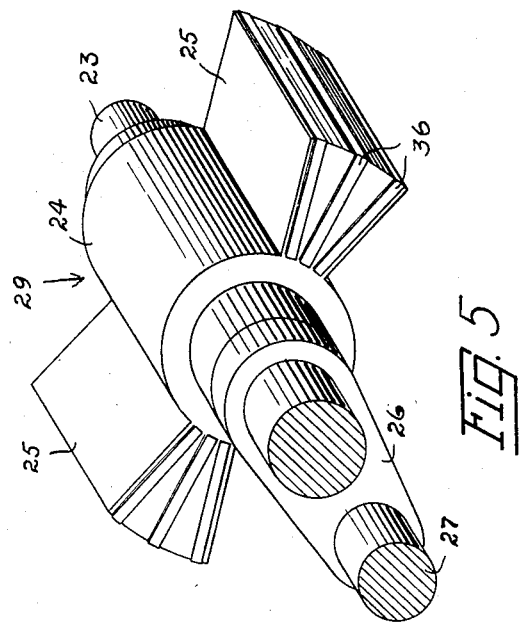
INVENTOR.
JOHN A. DAVIS.
BY Henry N. Young
ATTORNEY Dec. 26, 1933.        J. A. DAVIS        1,940,788
INTERNAL COMBUSTION ENGINE
Filed Feb. 7, 1931        5 Sheets-Sheet 5
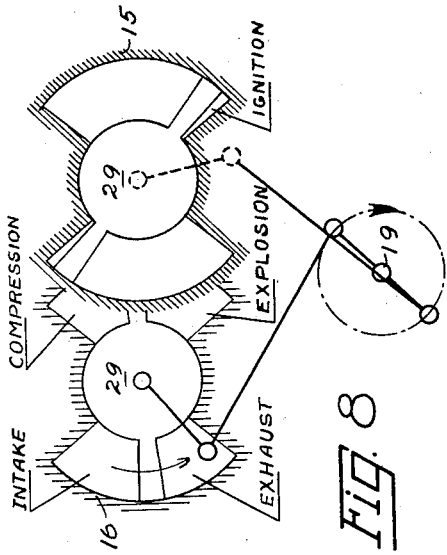
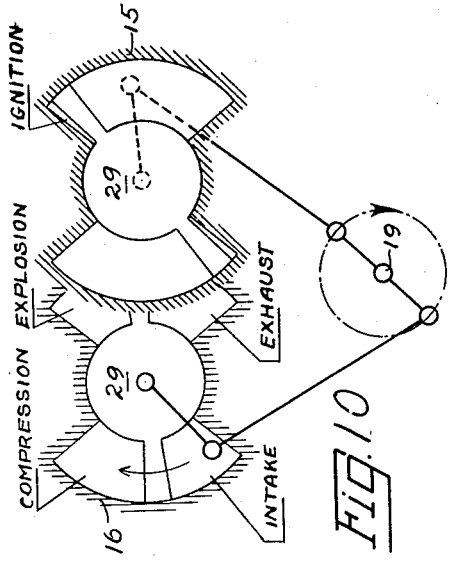
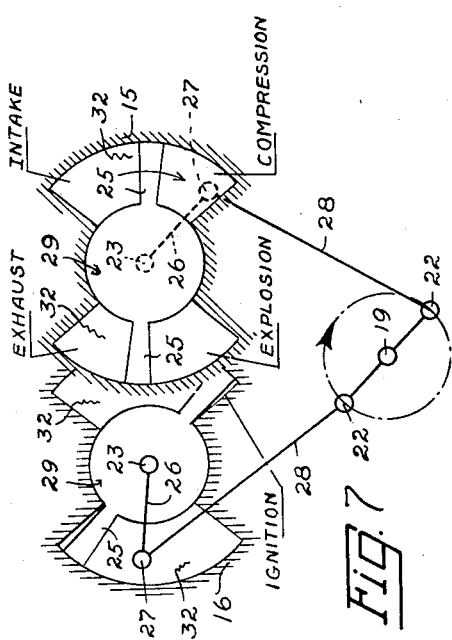
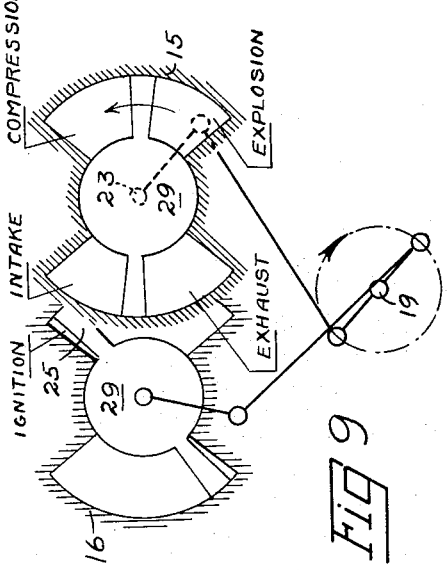
INVENTOR.
JOHN A. DAVIS
BY Henry N. Young
ATTORNEY Patented Dec. 26, 1933

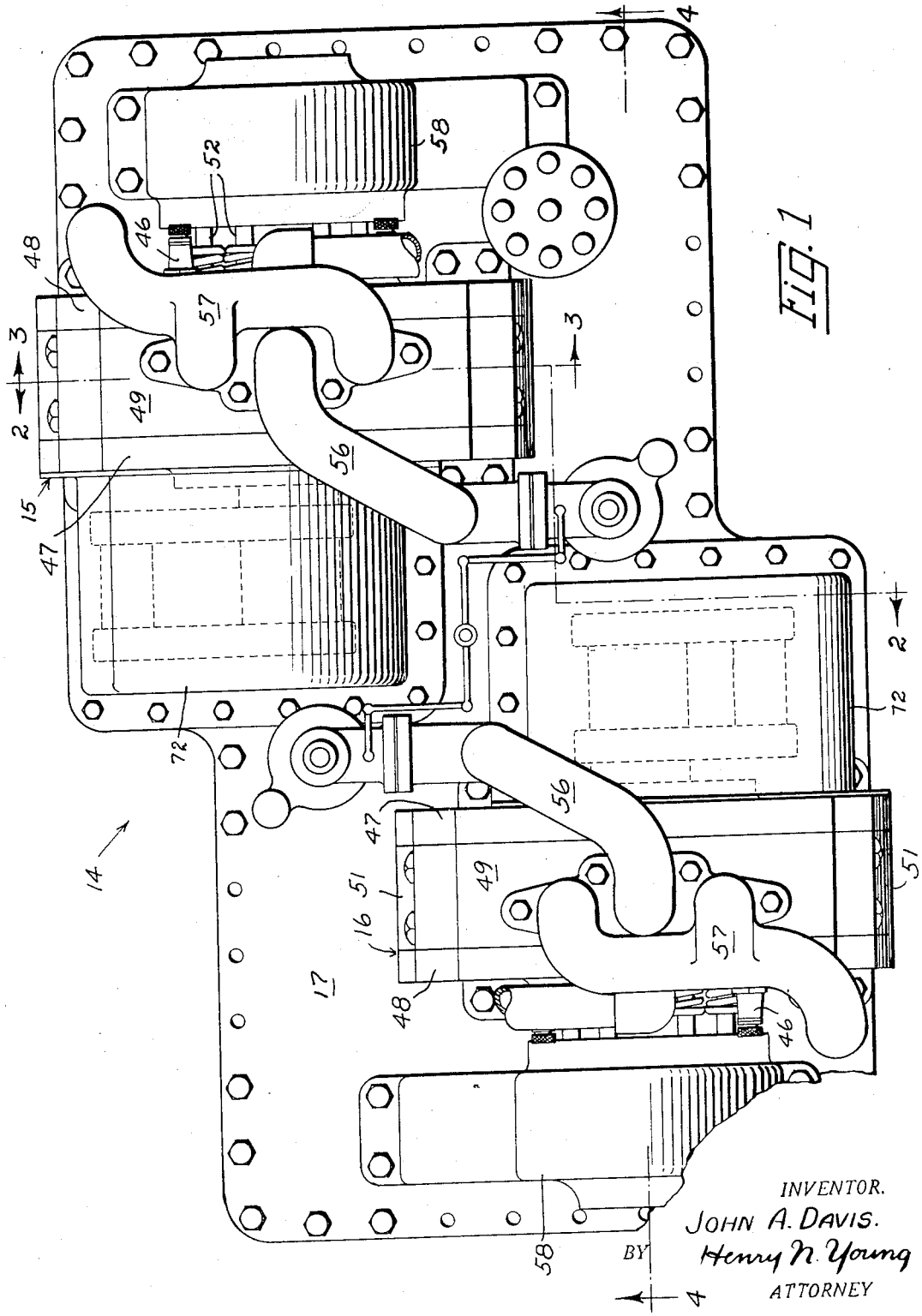

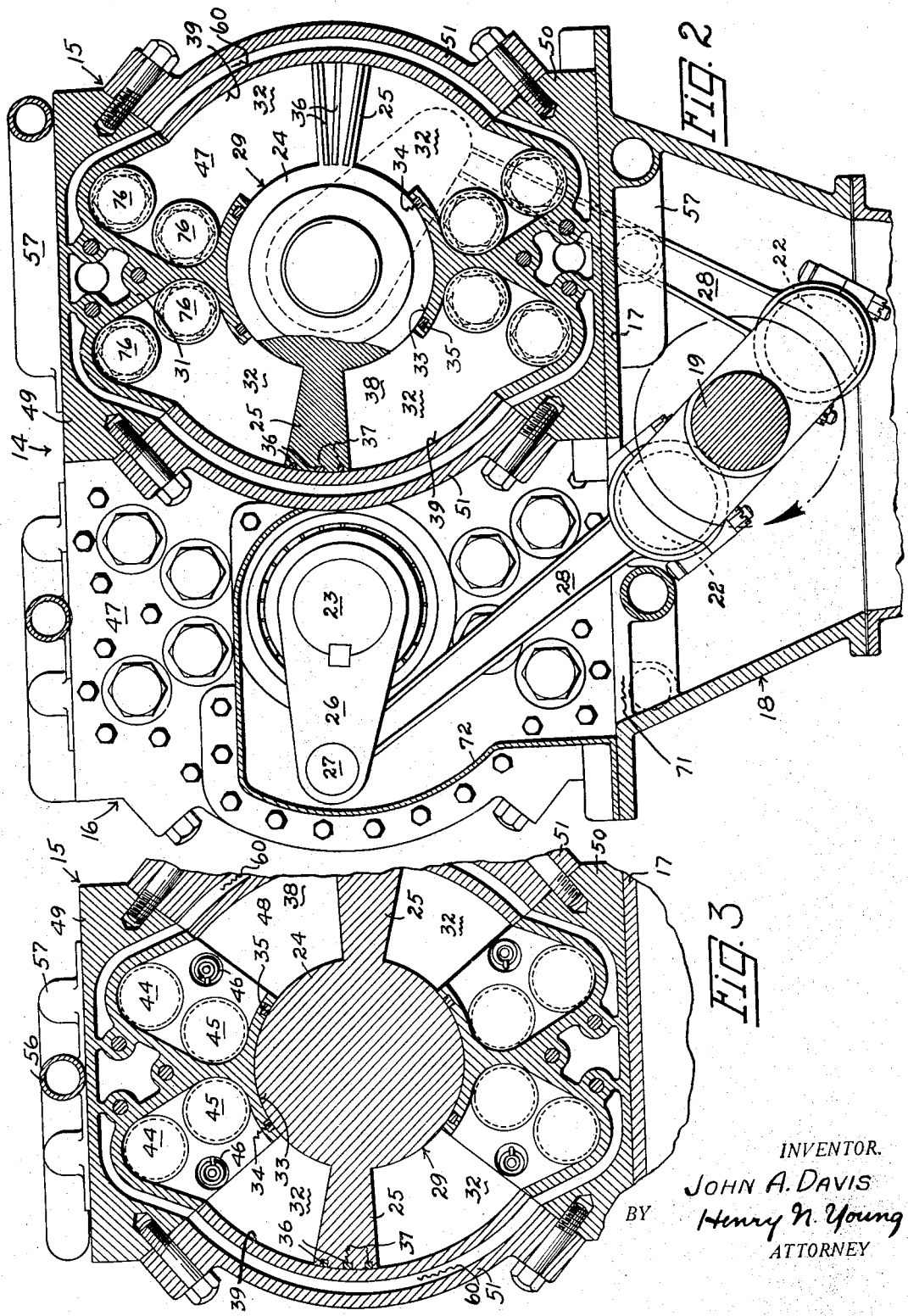

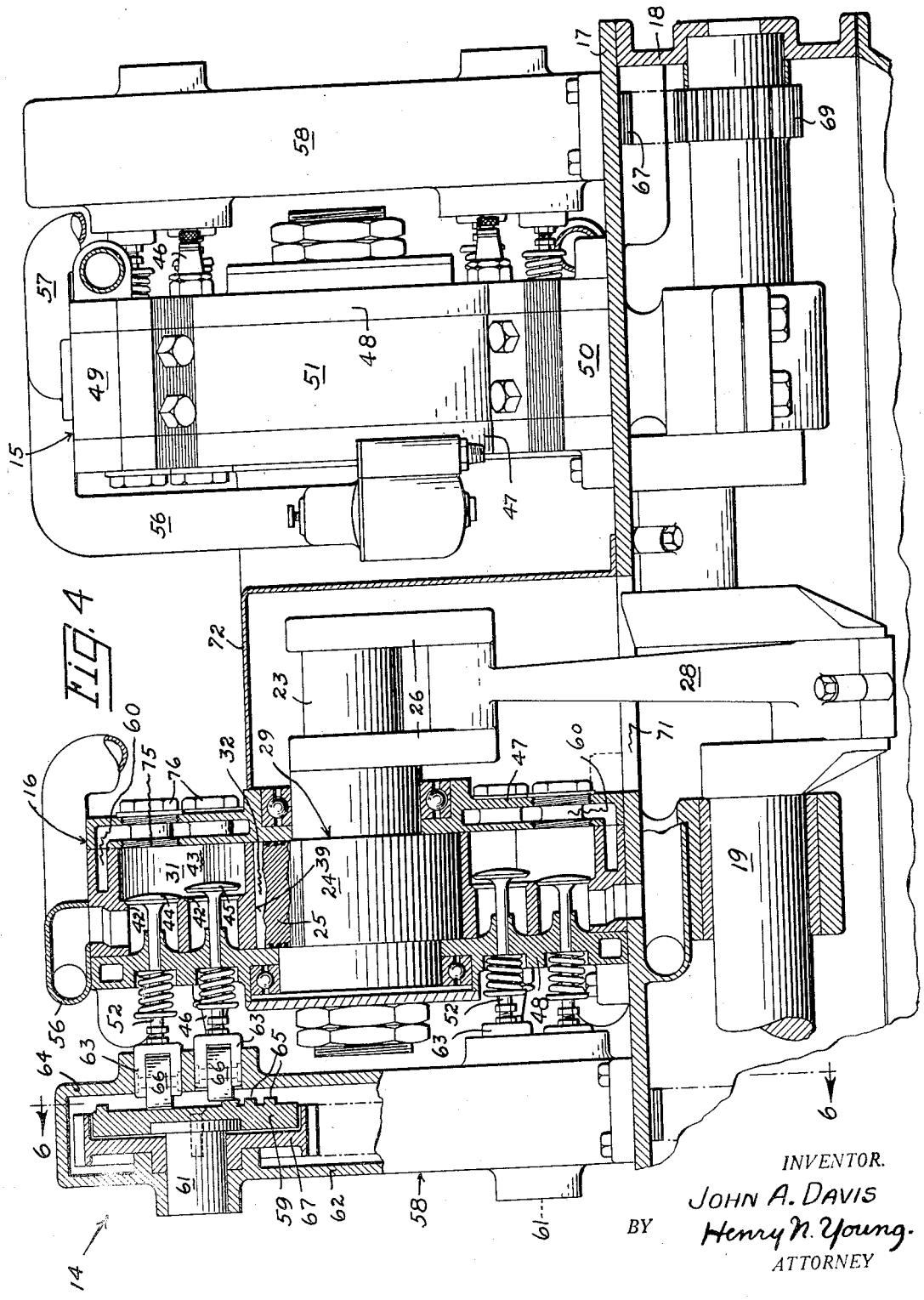

1,940,788

UNITED STATES PATENT OFFICE 1,940,788

INTERNAL COMBUSTION ENGINE

John A. Davis, Lomita, Calif., assignor of one-fourth to Frank J. Smallwood and one-fourth to George Adams, both of Oakland, Calif., and one-fourth to Tray Davis, Berkeley, Calif.

Application February 7, 1931. Serial No. 514,114

4 Claims. (Cl. 123—18)

The invention relates to an internal combustion engine.

An object of the invention is to provide an improved internal combustion engine wherein pistons thereof oscillate in arcuate explosion chambers.

Another object is to provide an internal combustion engine of the class described wherein a single rotor carrying a pair of pistons is the operative equivalent of four pistons in a four-stroke-cycle engine of the reciprocating piston type.

A further object of the invention is to provide a particularly compact and simple engine structure for generating a given amount of power.

Yet another object is to provide an engine of the class described wherein a plurality of rotors operating as indicated are coactive to drive a rotary power shaft in such a manner that dead-center relations are minimized.

The invention possesses other objects and features of advantage, some of which, with the foregoing, will be set forth or be apparent in the following description of a preferred embodiment thereof and in the accompanying drawings, in which, Figure 1 is a plan view of an engine structure embodying the present invention.

Figure 2 is a partly sectional elevation on the broken line 2—2 in Figure 1.

Figure 3 is a fragmentary sectional elevation on the line 3—3 in Figure 1.

Figure 4 is partly sectional elevation taken generally on the line 4—4 in Figure 1.

Figure 5 is a perspective view of a rotor element of the engine.

Figure 6 is a sectional view at 6—6 in Figure 4 showing valve-operating cam plates and a driving means therefor.

Figure 7 is a diagrammatic view showing working elements of the engine in the relation shown in Figure 2.

Figures 8 to 10 inclusive are diagrammatic views similar to Figure 6 and showing the pistons of the engine in progressively different relations in a cycle of movements thereof.

As particularly illustrated, the features of present invention are incorporated in the structure of an engine 14 comprising two similar cylinder blocks 15 and 16 mounted on a common baseplate 17, said plate constituting the upper wall of a crankcase 18 in which a crankshaft 19 is supported in parallel relation to the plate 17. Cylinder cavities of like size are defined in the blocks 15 and 16, the axes of said cavities being laterally spaced as well as parallel to and equally spaced from the axis of the shaft 19. As shown, the cylinder cavity axes are equally spaced from and at opposite sides of a vertical plane through the crankshaft axis whereby planes including the said cavity axes and the crankshaft axis make equal angles with said vertical plane; preferably, the said angles approximate twenty-two and one-half degrees, whereby said first planes intersect in the crank shaft axis at an angle of substantially forty-five degrees. The two crank pins 22 of the shaft 19 are at diametrically opposite sides of the shaft axis and are equally spaced from said axis. The aforesaid relations of the various axes are particularly brought out in Figures 7 to 10.

Shafts 23 extend axially through the cylinder cavities of the blocks 15 and 16, said shafts journalled in said blocks at the cavity ends and each carrying a rotor comprising a cylindric hub 24 from which two piston vanes 25 extend radially and oppositely. Extending ends of the rotor shafts 23 are provided with crank arms 26 having crank pins 27 disposed laterally opposite the different crank pins 22 of the rotary shaft 19, and connecting rods 28 of like length connect each pin 27 with the opposed pin 22. The crank arms 26 are longer than the crank arms of the shaft 19, whereby the rotors are arranged to oscillate as the shaft 19 rotates. The combination of shaft 23 with its hub 24, pistons 25 and crank arm 26 is seen to provide a unitary rotor 29, as is particularly brought out in Figures 2, 3 and 5.

Each cylinder cavity is divided by a pair of fixed radial and mutually coplanar partitions 31 to provide a pair of arcuate chambers 32 of like size, said partitions terminating at the rotor hub 24, and a piston 25 being operative in each said chamber whereby it variably partitions the chamber as it is oscillated therein. The inner partition ends present cylindrical surfaces 33 in opposition to the hub 24, and, as shown, said partition ends may be provided with packing grooves 34 extending longitudinally along the hub and containing a suitable packing 35 for maintaining a seal between the partitions and hub; in this manner the chambers 32 are sealed from each other.

The pistons 25 are arranged to sealedly partition the chambers 32, and to that end said pistons are provided with metallic and generally U-shaped packing rings 36 engaged in grooves 37 provided in the pistons and engaging both the flat ends 38 and cylindrical outer sides 39 of the chambers. The hub 24 and partitions 31 are understood to complete the definition of the chamber spaces at opposite sides of the pistons. Working explosions are arranged to take place in each said space once during a cycle of operation of the piston in the chamber whereby each said piston is double-acting in its chamber. In the present instance, a piston is arranged to make four strokes in its chamber during each operative cycle thereof with respect to the chamber space defined at either side thereof; in this manner, a four-stroke operative cycle is provided with respect to each said space, and the two pistons of a rotor are the operative equivalent of a four piston engine of the more usual and single-acting reciprocating type. The present relation, it is noted, is accomplished by the use of but two moving parts—the rotor 29 and one connecting rod 28—for transmitting the explosive energy of combustion from the four explosion spaces to the driven crankshaft 19.

Admission and exhaust ports 41 and 42 are provided at the partition ends of the chambers 32. As shown, said partitions are recessed to provide clearance spaces 43 in which poppet valves 44 and 45 of a usual disc shape are arranged to operate for controlling the respective ports 41 and 42 as required. Suitable ignition devices 46 may also be provided in said spaces 43; in the present instance the devices 46 comprise electric spark plugs of a usual gap type.

It will now be noted that each of the blocks 15 and 16 is formed in sections, there being a section 47 defining the end of the cylinder cavity through which the crank-carrying end of the shaft 23 extends, a section 48 defining the other cylinder end, upper and lower sections 49 and 50 providing the partitions 31, and side sections 51 providing the cylinder side portions 39 which in part define the chambers 32. The block sections 47 of the two units are mutually opposed whereby the said units are reversedly related to a common plane between them, and the sections 48 are at opposite ends of the described assembly. Each section 48 carries the stems 52 of the poppet valves 44 and 45, said stems disposed in parallel relation to the shaft axes and extending outwardly from the section for use as a valve operating means. Compression springs 53 are coactive between the stems 52 and section 48 to constantly urge the seating of the valves. Perforations 75 in the sections 47 and opposite the valves are provided for removing the latter, said perforations normally closed by plugs 76.

The sections 48 are arranged to cooperate with suitable recesses in the block sections 49 and 50 to define passages 54 and 55 to the ports 41 and 42, said passages respectively connected to intake and exhaust manifolds 56 and 57. The spark plugs 46 are also mounted in the sections 48; since the circuits including the spark plugs would be usual ones, neither these circuits nor the controlling means therefor are specifically disclosed. Suitable water-jacketing cavities 60 are provided in the engine blocks for the circulation of cooling fluid about the cylinders.

Means are provided for actuating the valves 44 and 45; as shown, the appropriate mechanism is provided in casings 58 mounted on the base plate 17 opposite the block sections 48. As particularly disclosed in Figures 4 and 6, the valve operating mechanism of each casing 58 comprises a disc 59 mounted on a shaft 61 journalled in the outer casing wall 62. Slide blocks 63 are mounted in the inner casing wall 64, said blocks adjustably fixed on the outer ends of the valve stems 52 for longitudinal movement therewith as extensions thereof. Cam wedges 65 protrude from the face of the disc 59 opposite the slide blocks and for periodic engagement therewith to effect opening displacements of the different valves for the proper periods in the cycles of operation of the pistons with reference to the different explosion spaces of the cylinder. In the present embodiment, the wedges 65 are arranged to operate on the blocks 63 through rollers 66 mounted on the blocks.

For driving the cam discs 59, like sprocket-wheels 67 are fixed on the two shafts 61 of each casing 58 and in mutually coplanar relation, and a drive chain 68 engages around said sprocket-wheels and a sprocket-wheel 69 fixed on the crankshaft 19 in the plane of the first sprocket wheel. Since the present engine unit operates with a four-stroke cycle, the sprocket-wheel 69 has half as many teeth as the sprocket-wheels 67.

The base plate 17 is appropriately perforated at 71 for the extension and free movement of the connecting rods 28 therethrough. Casings 72 are provided for mounting on the plate at the openings 71 and to enclose the protruding crank ends of the shafts 23, said casings secured to the adjacent engine block end sections 47 as well as to the base plate.

Referring now more particularly to the diagrammatic showings of Figures 7 to 10 inclusive, the operative conditions and the piston and crank positions are seen to be therein indicated in order for four successive half-stroke movements of the pistons in both cylinders of the present assembly, the range of movement representing three-eighths of a cycle of operation of each piston. It is to be noted that when the pistons in the unit of block 15 are at mid-stroke positions the pistons of the other unit are at stroke-end positions. A further noteworthy relation in the present engine is the fact that when the pistons are in mid-stroke position, their line lies in the plane of the rotor axes. The aforesaid structural and operative relations of the engine are seen to be such that during the working strokes of the connecting rods 19, the crank pins 22 of the crankshaft move through arcs of less than one hundred eighty degrees, said arcs terminating short of dead-center positions for the wrist pins. The rods 19 are understood to alternatively operate as thrust and tension members for transmitting power from the cylinders to the crankshaft.

It is to be noted that the present engine provides the operative equivalent of a usual eight cylinder engine wherein eight pistons operate with four-stroke cycles in eight different cylinders. While the present disclosure is specific to the combination of two like assemblies or units to provide an engine, it is noted that an engine embodying the present features may be built up of three or more of said units without difficulty. The disclosed engine has been particularly designed for use to provide the motive power for motor-driven vehicles wherein the weight and space requirements per developed unit of power must be a minimum; the present engine is particularly compact and light for the power output thereof.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In an internal combustion engine, a plurality of fixed cylinders each divided by radial partitions to define two equal chambers, a rotor in each said cylinder for oscillation about the cylinder axes and having radial pistons operative in said chambers, fuel intake and exhaust and ignition means at each end of each said chambers whereby each said piston is arranged to be double-acting with four-stroke cycles of operation, a shaft to be jointly driven by said rotors, and means operably connecting said shaft with said rotors whereby the operative cycles of the pistons of one said cylinder correspond to and are fractionally ahead of the operative cycles of the pistons of another said cylinder to a constant degree.

2. In an internal combustion engine, a pair of fixed cylinders each divided by radial partitions to define two equal chambers, a rotor in each said cylinder for oscillation about the cylinder axes and having radial pistons operative in said chambers, fuel intake and ignition and exhaust means for each said chamber whereby each said piston is arranged to be double-acting with four-stroke cycles of operation, a shaft to be jointly driven by said rotors, and means operably connecting said shaft with said rotors whereby the operative cycles of a piston of one said cylinder are constantly one-eighth of a cycle ahead of a piston of the other said cylinder, said cycles being alike.

3. In an internal combustion engine, a pair of cylinders having their axes mutually parallel and laterally spaced, pistons for working oscillation in said cylinders and about the said axes thereof, rotors carrying said pistons, a shaft to be jointly driven by said rotors and having its axis parallel to and equally spaced from said cylinder whereby planes including the said shaft axis and the different rotor axes make an angle of substantially forty-five degrees with each other, and driving connections between said rotors and shaft whereby corresponding operative cycles in said cylinders are arranged to deliver a succession of rotative impulses to said shaft.

4. In an internal combustion engine, a pair of cylinders providing pairs of combustion chambers and having their axes mutually parallel and laterally spaced, diametrically opposed pistons for working oscillation in said chambers and about the said cylinder axes, independent shafts carrying said pistons and extending axially from said cylinders, crank arms at the protruding ends of said piston shafts, a crankshaft parallel to and equally spaced from said first shafts, crank pins of said crankshaft at diametrically opposite sides thereof and in the planes of movement of the crank pins of said crank arms, and connecting rods engaged with and between the corresponding crank pins of the shafts whereby said pistons are arranged to extend in the common plane of said piston shafts at midstroke thereof.

JOHN A. DAVIS.